(12) United States Patent
Suchsland et al.

(10) Patent No.: US 11,299,810 B2
(45) Date of Patent: Apr. 12, 2022

(54) BARRIER LAYER FOR CORROSION PROTECTION IN ELECTROCHEMICAL DEVICES

(71) Applicant: SOLVICORE GMBH & CO. KG, Hanau-Wolfgang (DE)

(72) Inventors: Jens-Peter Suchsland, Offenbach (DE); Alessandro Ghielmi, Frankfurt am Main (DE); Pia Braun, Langenselbold (DE)

(73) Assignee: Greenerity GMBH, Hanau-Wolfgang (DE)

( * ) Notice: Subject to any disclaimer, the term of this patent is extended or adjusted under 35 U.S.C. 154(b) by 523 days.

(21) Appl. No.: 14/761,782

(22) PCT Filed: Feb. 20, 2014

(86) PCT No.: PCT/EP2014/053315
§ 371 (c)(1),
(2) Date: Jul. 17, 2015

(87) PCT Pub. No.: WO2014/128208
PCT Pub. Date: Aug. 28, 2014

(65) Prior Publication Data
US 2015/0354072 A1    Dec. 10, 2015

(30) Foreign Application Priority Data
Feb. 21, 2013  (EP) ..................... 13156205

(51) Int. Cl.
*H01M 4/86*  (2006.01)
*H01M 8/02*  (2016.01)
(Continued)

(52) U.S. Cl.
CPC .............. *C25B 11/073* (2021.01); *C25B 9/23* (2021.01); *C25B 11/031* (2021.01);
(Continued)

(58) Field of Classification Search
None
See application file for complete search history.

(56) References Cited

U.S. PATENT DOCUMENTS

| | | | |
|---|---|---|---|
| 5,487,825 A | 1/1996 | Kurze | |
| 6,936,370 B1 | 8/2005 | Knights | |

(Continued)

FOREIGN PATENT DOCUMENTS

| | | | | |
|---|---|---|---|---|
| EP | 1701790 | * | 9/2009 | .............. B01J 23/46 |
| EP | 1701790 B1 | | 9/2009 | |

(Continued)

*Primary Examiner* — Jonathan Crepeau
*Assistant Examiner* — Angela J Martin
(74) *Attorney, Agent, or Firm* — Levin Santalone LLP; John Santalone (57) ABSTRACT

The invention is directed to a barrier layer for corrosion protection in electrochemical devices, e.g. carbon based gas diffusion layers (GDLs) in electrochemical devices, comprising electrically conductive ceramic material and a non-ionomeric polymer binder. The electrically conductive ceramic material has an electrical conductivity of >0.1 S/cm, preferably >1 S/cm in air atmosphere (as detected by the powder method) and is selected from the group of precious metal and/or base metal containing oxides, carbides, nitrides, borides and mixtures and combinations thereof. Membrane-electrode assemblies (MEAs), catalyst-coated membranes (CCMs), gas diffusion electrodes (GDEs) and gas diffusion layers (GDLs) comprising the barrier layer of the invention show improved corrosion resistance, preferably against carbon corrosion; particularly in start-up/shut-down cycles and fuel starvation situations of PEM fuel cells.

13 Claims, 3 Drawing Sheets

(51) Int. Cl.
*C25B 11/073* (2021.01)
*H01M 8/0245* (2016.01)
*H01M 8/0234* (2016.01)
*C25B 9/23* (2021.01)
*C25B 11/031* (2021.01)
*C25B 11/051* (2021.01)
*H01M 8/10* (2016.01)

(52) U.S. Cl.
CPC ......... *C25B 11/051* (2021.01); *H01M 4/8605* (2013.01); *H01M 4/8657* (2013.01); *H01M 8/0234* (2013.01); *H01M 8/0245* (2013.01); *H01M 4/8615* (2013.01); *H01M 2008/1095* (2013.01); *H01M 2300/0082* (2013.01)

(56) References Cited

U.S. PATENT DOCUMENTS

| | | | |
|---|---|---|---|
| 7,374,838 B2 * | 5/2008 | Gallagher | H01M 8/1007 |
| | | | 429/434 |
| 7,767,330 B2 | 8/2010 | Merzougui | |
| 7,909,969 B2 | 3/2011 | Yang | |
| 2003/0068544 A1 * | 4/2003 | Cisar | C25B 1/06 |
| | | | 429/524 |
| 2003/0190517 A1 | 10/2003 | Elter | |
| 2004/0013935 A1 | 1/2004 | Ye | |
| 2008/0187813 A1 * | 8/2008 | Ye | H01M 4/8636 |
| | | | 429/465 |
| 2009/0068541 A1 | 3/2009 | Yan | |
| 2009/0087716 A1 * | 4/2009 | Abd Elhamid | B82Y 30/00 |
| | | | 429/409 |
| 2009/0162725 A1 | 6/2009 | Terazono | |
| 2010/0092815 A1 | 4/2010 | Condit | |
| 2010/0227251 A1 | 9/2010 | Okura | |
| 2011/0256466 A1 | 10/2011 | Bessarabov | |

FOREIGN PATENT DOCUMENTS

| | | | | |
|---|---|---|---|---|
| EP | 2475034 A1 | * | 7/2012 | ............. H01M 4/90 |
| EP | 2475034 A1 | | 7/2012 | |
| JP | 2003-193216 A | | 7/2003 | |
| JP | 2003193216 | * | 7/2003 | ............. B32B 15/04 |
| JP | 2008-41411 A | | 2/2008 | |
| JP | 2011134600 | * | 7/2011 | ............. H01M 4/86 |
| WO | 2001-055489 A2 | | 8/2001 | |
| WO | WO 2007059278 | * | 5/2007 | ............. H01M 8/00 |
| WO | 2007-119134 A1 | | 10/2007 | |
| WO | 2008-024465 A2 | | 4/2008 | |
| WO | 2010-075492 A1 | | 7/2010 | |
| WO | 2010-094256 A1 | | 8/2010 | |
| WO | 2011-021034 A1 | | 2/2011 | |
| WO | 2011-076396 A1 | | 6/2011 | |
| WO | 2011-046594 A3 | | 10/2011 | |
| WO | 2012-074500 A1 | | 6/2012 | |

\* cited by examiner

BARRIER LAYER FOR CORROSION PROTECTION IN ELECTROCHEMICAL DEVICES

FIELD OF INVENTION

The present invention is directed to the field of electrochemistry and fuel cells. This invention provides a barrier layer for corrosion protection in electrochemical devices, e.g. for carbon-based gas diffusion layers (GDLs) or current collectors, in electrochemical devices such as polymer electrolyte fuel cells ("PEMFC") or PEM electrolyzer cells. The barrier layer of the present invention finds use in PEMFC components such as membrane electrode assemblies ("MEAs"), catalyst-coated membranes ("CCMs"), gas diffusion electrodes ("GDEs") and gas diffusion layers ("GDLs"). More specifically, the barrier layer disclosed in the present invention provides improved resistance to carbon corrosion of carbon-based GDLs and leads to a better stability in start-up/shut down cycles and fuel starvation situations in PEMFC.

BACKGROUND OF THE INVENTION

Fuel cells (FCs) are power generating electrochemical devices used or commercially foreseen to be used for a wide range of different applications including, for instance, automotive drive trains, stationary units for residential heating, embarked auxiliary power units, portable electronic equipments and remote or portable back-up units. In principle, a fuel cell converts the chemical energy of hydrogen ($H_2$ gas) or another fuel into electrical current and heat; water is produced as by-product in this electrochemical reaction. During operation of the PEM fuel cell, reduction of oxygen takes place at the cathode and oxidation of hydrogen (or other fuel) takes place at the anode of the fuel cell. Finally, water, electric power and heat are produced.

A PEM fuel cell (PEMFC) is, more particularly, a fuel cell comprising a solid polymer-electrolyte membrane, sometimes also called proton-exchange membrane (hereafter referred to as "membrane" for sake of convenience) such as a proton-conducting perfluorosulfonic acid membrane (commercially available under the name Nafion®) or a hydrocarbon acid membrane.

Examples of PEMFCs are hydrogen PEMFCs, reformed-hydrogen PEMFCs and direct methanol PEMFCs (frequently abbreviated as "DMFC").

Figure 1:
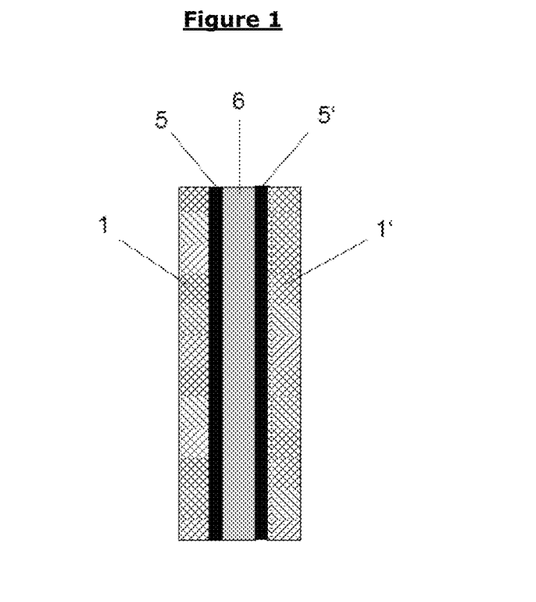

A PEMFC is built up as a stack of so-called membrane-electrode-assemblies (MEAs) and bipolar flowfield plates. The membrane electrode assembly (MEA) in turn is a key component of the PEMFC stack and has a significant influence on its end-use characteristics. A general, simplified structure of a MEA is shown in FIG. 1. A membrane-electrode assembly is based on a multilayer structure and typically comprises 5 layers. An ionomer membrane (6) in the center, a cathode gas diffusion layer (1) (hereinafter called "cathode-GDL"), an cathode catalyst layer (5), an anode catalyst layer (5') and a anode gas diffusion layer (1') (hereinafter called "anode-GDL").

A "catalyst-coated membrane" (hereinafter abbreviated "CCM") comprises an ionomer membrane (6) that is provided on both sides with the catalytically active layers, i.e. the cathode catalyst layer (5) and the anode catalyst layer (5'). Because the CCM comprises basically three layers (anode catalyst layer, ionomer membrane and cathode catalyst layer), it is often referred to as a "three-layer MEA."

"Gas diffusion layers" ("GDLs"), sometimes referred to as gas diffusion substrates or backings, are placed onto the anode and cathode layers of the CCM in order to bring the gaseous reaction media (e.g., hydrogen and air) to the catalytically active layers and, at the same time, to establish an electrical contact. GDLs may be coated with a microporous layer in order to improve the contact to the electrode.

"Gas diffusion electrodes" ("GDEs") are GDLs coated with a catalyst layer on the side facing the ionomer membrane. GDEs are often referred to as catalyst-coated GDLs or "catalyst-coated backings" (abbreviated "CCBs").

Generally, a MEA can be manufactured by combining a CCM with two GDLs (on the anode and the cathode side) or, alternatively, by combining an ionomer membrane with two gas diffusion electrodes (GDEs) at the anode and the cathode sides. In both cases, a five-layer MEA product is obtained.

PEM electrolysers generally have a similar structure to a PEM fuel cell, but they operate in a different way. Compared to a regular PEM fuel cell, the flow of current and the electrodes are reversed in a PEM electrolyser, so that decomposition of water takes place. The liberation of oxygen occurs at the anode ("oxygen evolution reaction" or "OER" for short) and the reduction of protons ($H^+$), which pass through the polymer electrolyte membrane, takes place at the cathode ("hydrogen evolution reaction" or "HER" for short). The result is that water is decomposed into hydrogen and oxygen with the aid of electric current.

A membrane-electrode-assembly ("MEA") for a PEM water electrolyser (hereinafter also referred to as "electrolysis MEA") generally contains a polymer electrolyte membrane (for example Nafion® from DuPont) which is arranged in a sandwich construction between two electrodes and two porous gas diffusion layers (GDLs) which are each mounted on the two sides of the electrodes. Generally, due to corrosion effects, carbon-based GDL materials cannot be used on the anode side of electrolysis MEAs.

In the following the technology of regular PEM fuel cells is further described. In the anode layer, an appropriate electrocatalyst, generally a platinum or a platinum alloy electrocatalyst, causes the oxidation of the fuel (for instance hydrogen or methanol) generating, notably, positive hydrogen ions (protons) and negatively charged electrons. The membrane allows only the positively charged hydrogen ions to pass through it in order to reach the cathode layer, whereas the negatively charged electrons travel along an external circuit connecting the anode with the cathode, thus creating an electrical current.

The gas diffusion layers (GDLs) usually comprise relatively thick porous layers and are located between the electrode layers and the flow field plates. Primary purpose of a GDL is to assure a better access of the reactant gases to the electrode layers and an efficient removal of water (in either liquid or vapor form) from the fuel cell, to enhance the electrical conductivity of the fuel cell assuring a better electrical contact between the electrode layers and the flow-field plates and last but not least to provide the mechanical strength necessary to preserve the structural integrity of the electrode layers.

The GDL usually comprises carbon paper or carbon woven cloth, possibly treated with variable amounts of per- or partly-fluorinated polymers in order to properly control its electrical conductivity, mechanical strength, hydrophobicity, porosity and mass-transport properties.

It is known that during operation of electrochemical cells such as fuel cells, the cells of the stack and the membraneelectrode-assembly (MEA) incorporated therein can be exposed to high potentials (>1.2 V), both on the cathode and the anode side.

High potentials on the cathode typically occur upon restart of the fuel cell after the cell has been shut down for a prolonged period of time and hydrogen is introduced at the anode side while air is present on both sides of the MEA (referred to as "air/air starts"). The mechanism leading to high potentials in this case is commonly known as "current reverse mechanism".

High potentials on the anode side may occur if fuel is delivered insufficiently to the electrode while demanding a certain power to the cell, which drives the cell into reverse voltage. This case is commonly known as "fuel starvation" or "cell reversal".

The oxygen side of the cell can also be exposed to high potentials for prolonged periods when the fuel cell is used in the so-called "reversible mode". Hereby, hydrogen and oxygen are generated by supplying water to the cell while at the same time applying a voltage difference through an external load, which is sufficiently high to cause water electrolysis.

Under such high potential events or conditions, carbon-containing electrodes (e.g. carbon-supported electrocatalysts) of the fuel cell undergo degradation due to corrosion of the carbon support material.

To reduce such degradation phenomena, electrocatalysts based on graphitized carbon black may be employed and/or catalysts able to facilitate water oxidation are added to the electrodes so that the reaction current is sustained by water oxidation rather than by carbon corrosion (e.g. ref. to US2009/0162725 A1 and US2009/0068541 A1). However, this strategy mitigates the problem but does not completely prevent carbon corrosion.

WO2007/119134A1 discloses a PEMFC, in which two separate layers are implemented on the anode and the cathode side, which contain a water-electrolysis catalyst as so-called "fuel deficiency countermeasure". Preferably such water electrolysis catalysts are based on iridium and/or ruthenium oxides. The two separate layers comprise ionomeric binder materials.

EP 2475034 discloses improved MEAs for PEMFC, which are based on electrodes containing a mixture of Pt-based electrocatalysts with electrocatalysts comprising an iridium oxide component and ionomeric binder.

The use of Ir-based catalyst materials is further reported in U.S. Pat. No. 6,936,370 and WO2011/021034.

An alternative approach to reduce the problem of carbon corrosion is to substitute carbon-based electrocatalysts in the catalyst layer with carbon-free electrocatalysts. These materials generally comprise catalyst particles (usually platinum or platinum alloys) finely dispersed on corrosion-stable electrically conductive support materials. Typically, conductive ceramic materials such as metal oxides, nitrides or carbides are used as catalyst support materials.

In the patent literature a broad number of electrically conductive ceramic materials have been disclosed for use as conductive additives in catalyst layers (e.g. ref to U.S. Pat. No. 7,767,330 B2).

It was found that, even when such corrosion stable catalysts are used, still the MEA performance is deteriorated by exposure to high voltages. This occurs as the gas diffusion layers (GDL), which are generally part of a 5-layer MEA, are typically also carbon-based, and thus subject to corrosion. In simple words, if the electrocatalyst layer is stable enough, the GDL becomes the "weak part" of the MEA in terms of corrosion.

Such corrosion of the GDL was detected by the presence of carbon dioxide ($CO_2$) in the outlet gas of the cell, which obviously cannot originate from the electrodes in case carbon-free electrocatalysts are employed.

Further, GDL corrosion was reported and demonstrated also by atomic force microscopy, Hg-intrusion porosimetry, electron microscopy and performance deterioration. Thus, corrosion-stable electrodes (i.e. catalyst layers) mitigate but do not solve the problem of MEA deterioration under high potential events as long as carbon-based GDLs are employed in said MEAs.

Various proposals are made to overcome this problem. U.S. Pat. No. 7,909,969 discloses coating of gas diffusion layers (GDLs) with a micro-protective layer to increase corrosion stability when the cell is operated in the water electrolysis mode. The micro-protective layer is tightly adhered to the GDL and consists essentially of catalysts for catalyzing active oxygen species to become non-active oxygen gas and corrosion-resistant metallic powders for assisting said catalysts. U.S. Pat. No. 7,909,969 is silent in regard to the chemical nature of the active catalysts employed; Ti and Ti alloys are reported as corrosion-resistant metallic powders.

US 2003/0190517 discloses cathode electrodes for fuel cells, comprising a non-electrolytic layer acting to reduce the degradation of the ionomer membrane. The non-electrolytic layers typically contain a catalyst for catalyzing the reaction of peroxide into water; they do not contain conductive ceramic oxides.

WO2011/076396 A1 discloses introducing a selectively conducting component on the anode side of a PEMFC to mitigate cathode degradation (i.e. carbon corrosion and platinum dissolution) during start-up and shut-down events. The selectively conductive component contains a selectively conducting material, typically a metal oxide, exhibiting a low resistance when exposed to hydrogen and a high resistance (i.e. low electrical conductivity) when exposed to air. However, it is shown in the examples that MEAs containing a GDL coated with a selectively conductive layer on the cathode side show extremely poor voltage versus current characteristics. This is related to the high resistance of the selectively conductive component in air.

In summary, there is a need for improved corrosion protection in electrochemical devices. Further, there is a need for MEAs for PEMFCs which provide an improved stability against high cell potentials and which exhibit less deterioration of the polarization (U/I) characteristics after exposure to high voltages. More precisely, there is a need for MEAs with high corrosion resistance and improved stability, particularly in start-up/shut down cycles and fuel starvation situations.

One objective of the present invention is to provide means for improved corrosion protection in electrochemical devices. A further objective of the present invention is to provide barrier layers for corrosion protection in electrochemical devices. Finally, a further objective is to provide MEAs, CCMs, GDEs and GDLs comprising such barrier layers and showing improved stability against carbon corrosion.

Possible solutions for these objectives are provided in the claims of the present invention.

SUMMARY OF THE INVENTION

This invention provides a barrier layer for corrosion protection in electrochemical devices, e.g. for carbon-based gas diffusion layers (GDLs) in electrochemical devices. The barrier layer finds use in PEMFC components such as membrane electrode assemblies ("MEAs"), catalyst-coated membranes ("CCMs"), gas diffusion electrodes ("GDEs") and gas diffusion layers ("GDLs"). More specifically, the barrier layer provides improved resistance to carbon corrosion of carbon-based GDLs.

According to the present invention, the barrier layer (BL) comprises electrically conductive ceramic material and a non-ionomeric polymer binder.

Typically, the electrically conductive ceramic material has an electrical conductivity of >0.1 S/cm, preferably >1 S/cm and particularly preferred >10 S/cm in air atmosphere (as detected by the powder method).

Further, the electrically conductive ceramic material has a high acid stability showing a solubility of $<10^{-3}$ mol/l, preferably a solubility of $<10^{-4}$ mol/l and particularly preferred a solubility of $<10^{-5}$ mol/l upon acidic treatment in 1 M $H_2SO_4$ at 90° C.

In general, the electrically conductive ceramic material is selected from the group of precious metal and/or base metal containing oxides, carbides, nitrides, borides and mixtures and combinations thereof.

In the broadest aspect, the polymeric binder used in barrier layer of this invention is a non-ionomeric, non-conductive polymeric material, preferably a fluorine-containing polymer which may be partly or fully fluorinated.

By means of the present invention, MEAs for PEMFC showing improved stability against high cell potential events are obtained. Such improved stability and simultaneous high performance is achieved by introducing an additional layer (hereinafter called "barrier layer", BL) between the catalyst layer and the gas diffusion layer (GDL), comprising an electrically conductive oxidation-resistant ceramic material in combination with a non-ionomeric polymer binder.

It has been surprisingly found that when the MEA of the invention is operated at high cell voltages on the side where the barrier layer (BL) is present, degradation of the polarization characteristics is far less severe compared to the case where the BL is omitted. It has also been surprisingly found that the introduction of the BL does not detrimentally affect the performance (i.e. the polarization characteristics) of the MEA.

The BL may be introduced on the cathode side, the anode side or on both sides of the MEA, depending on which side of the electrochemical device components, e.g. the gas diffusion layers (GDLs) need to be protected against exposure to high potentials during operation.

DESCRIPTION OF SPECIFIC PRIOR ART

For the sake of clarification, the major differences between the barrier layer of the present invention and the selectively conducting component containing layer disclosed in WO2011/076396 (cited above) are outlined in more detail in the following section.

While WO2011/076396 refers to materials which are selectively conductive, i.e. conduct electrical current in hydrogen and insulate in oxygen or air, and are applied to the anode to protect the cathode from corrosion; the present invention refers to materials that are permanently electrically conductive, i.e. they conduct electrical current in hydrogen as well as in oxygen or air and under low and high potentials. The technical advantage is that (1) the barrier layer of the present invention can be applied to the cathode side (in order to protect the cathode side of the MEA) and (2) when applied to the anode, the barrier layer provides for dissipation of reversal currents and effectively protects the anode side of the MEA.

It should be noted that the material/layer of WO2011/076396 does not provide for dissipation of current under a cell reversal event, which potentially makes the event even more damaging for the anode side of the MEA. In order to solve this issue, WO2011/076396 proposes to make the layer patterned, providing some regions where the layer is absent.

Instead, the barrier layer of the present invention generally extends over the whole active area of the MEA, even when placed on the anode side, to provide effective and complete protection of the MEA. By active area it is meant the area being covered by the catalyst layer and being accessible to the reaction gases. Therefore the electrochemical reactions take place in the active area.

The material/layer of WO2011/076396 may be placed not only between the GDL and the anode layer, but anywhere in the electrical series of the cell, e.g. also between the bipolar plate and the GDL. This would not apply for the barrier layer according to the present invention, which aims to separate parts, which are subject to corrosion, e.g. the GDL from the catalyst layer and does not prevent electrical conductivity in the presence of oxygen or air. Due to this conceptual difference, the barrier layer of the present invention requires materials with different properties.

WO2011/076396 teaches to keep the layer containing selectively conducting material advantageously separated from the anode in order to avoid degradation of the layer, e.g. by incorporating a carbon sub-layer in between. This teaching again underlines the conceptual difference compared to the barrier layer of the present invention.

WO2011/076396 does not intend to protect the anode side from carbon corrosion; instead, it proposes to introduce a carbon sublayer against the anode. Under a cell reversal tolerance event, such carbon sublayer would be subject to corrosion and the cell would not work any more.

DETAILED DESCRIPTION OF THE INVENTION

The following drawings shall describe the various embodiments of the present invention in more detail. These embodiments may be used as products in various electrochemical devices.

As already outlined in the section above, the general simplified structure of a state-of-the art 5-layer MEA is shown in FIG. 1. The MEA comprises an ionomer membrane (6) in the center, a cathode gas diffusion layer (1), an cathode catalyst layer (5), an anode catalyst layer (5') and a anode gas diffusion layer (1').

Figure 2:
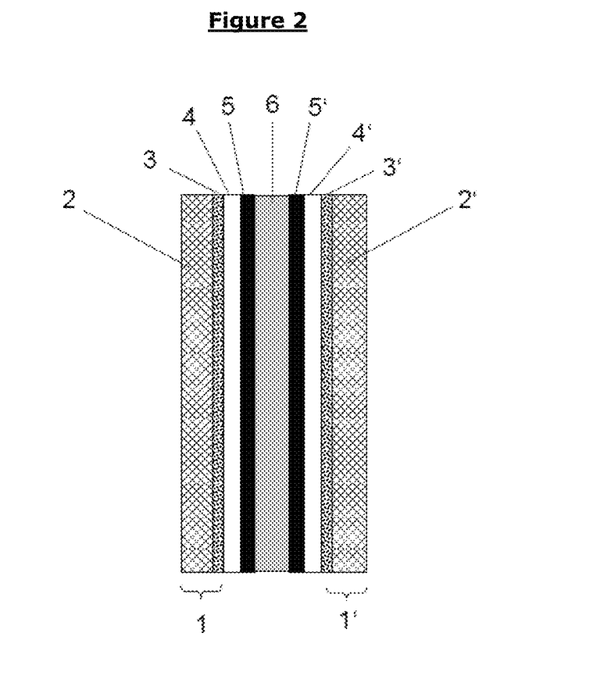

FIG. 2 schematically represents a MEA according to the first embodiment (embodiment 1) of the present invention. In this embodiment 1, the barrier layer (BL) is introduced on both sides of the MEA, i.e. on the cathode and on the anode side. Further, the gas diffusion layers (GDLs) with numerals 1 and 1' comprise two layers, namely a macro-porous carbon-based backing layer (numerals 2, 2') and an additional micro-porous layer (numerals 3, 3'). These microporous layers (3, 3') are frequently called "compensating layers" as they often have the function to smoothen the GDL surfaces which come in contact with the catalyst layer in the MEA.

The layers of numerals 1 to 5 represent the cathode side and the layers from numerals 1' to 5' represent the anode side, while numeral 6 represents the ionomer membrane in the center. Numeral 5 represents the cathode catalyst layer and numeral 5' the anode catalyst layer, respectively. Numeral 4 indicates the barrier layer (BL) on the cathode side; numeral 4' identifies the barrier layer on the anode side.

More precisely, embodiment 1 comprises a MEA layer structure showing the sequence 2-3-4-5-6-5'-4'-3'-2' (i.e. cathode GDL with microlayer and barrier layer, anode GDL with microlayer and barrier layer). Additionally, embodiment 1 encloses the two variations in which either the cathode GDL or the anode GDL comprises a microlayer while the opposite GDL is without it.

Thus, embodiment 1A comprises a MEA layer structure showing the sequence 2-3-4-5-6-5'-4'-2' (i.e. cathode GDL with microlayer and barrier layer, anode GDL without microlayer but with barrier layer).

Likewise, embodiment 1B comprises a MEA layer structure showing the sequence 2-4-5-6-5'-4'-3'-2' (i.e. cathode GDL without microlayer but with barrier layer, anode GDL with microlayer and barrier layer).

In the second embodiment (embodiment 2) of the present invention, the barrier layer (BL) is again introduced on the cathode and on the anode side of the MEA. However, the gas diffusion layers (GDLs) 1 and 1' comprise only one layer, namely a macro-porous carbon-based backing layer (2, 2') and a micro-porous layer is omitted. In such a case, the barrier layer (BL) can be seen as replacing the micro-porous layer. In this case, the barrier layers 4 and 4' are in direct contact with the macro-porous layers of the GDLs, which need to be protected against corrosion due to their carbonaceous nature. BLs 4 and 4' separate the electrodes from the GDLs and prevent deterioration of the MEA performance when the cathode side of the MEA (layers 1 to 5) and the anode side of the MEA (layers 1' to 5') are exposed to high cell potentials.

Various variations and combinations of the two embodiments described above are feasible. For example, in case only one side of the MEA needs to be protected, only one barrier layer (4 or 4') may be employed, either on the anode or on the cathode side of the MEA.

Thus, the third embodiment (embodiment 3) of the present invention is directed to a MEA structure, wherein the barrier layer (4') is applied only to the anode side. Hereby, the third embodiment includes all 4 variations generated by the use of GDLs with or without micro-layer on cathode and/or anode side.

More precisely, embodiment 3A comprises the MEA layer structure 2-3-5-6-5'-4'-3'-2' (i.e. cathode GDL with microlayer, anode GDL with microlayer and barrier layer).

Embodiment 3B comprises the MEA layer structure 2-5-6-5'-4'-3'-2' (i.e. cathode GDL without microlayer, anode GDL with microlayer and barrier layer).

Embodiment 3C comprises the MEA layer structure 2-3-5-6-5'-4'-2' (i.e. cathode GDL with microlayer, anode GDL without microlayer but with barrier layer).

And finally, embodiment 3D comprises the MEA layer structure 2-5-6-5'-4'-2' (i.e. cathode GDL without microlayer, anode GDL without microlayer but with barrier layer).

Corresponding to these combinations, the fourth embodiment (embodiment 4) of the present invention is directed to a MEA structure, wherein the barrier layer (4) is applied only to the cathode side. Here again, the fourth embodiment includes all variations generated by the use of GDLs with or without micro-layer on cathode and/or anode side.

Figure 3:
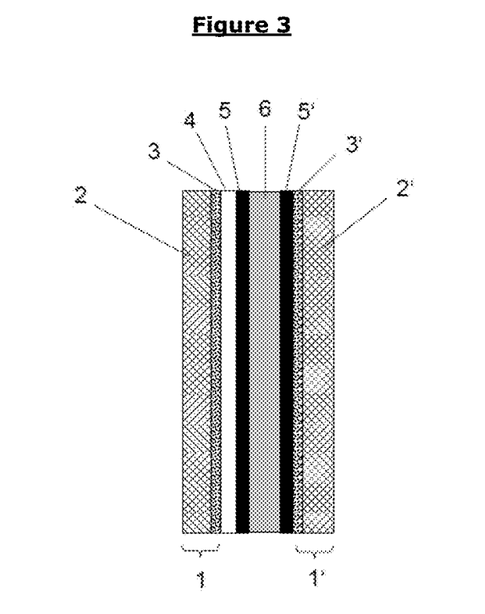

In more detail, embodiment 4A comprises the MEA layer structure 2-3-4-5-6-5'-3'-2' (i.e. cathode GDL with microlayer and barrier layer, anode GDL with microlayer). Embodiment 4A is shown in FIG. 3.

Embodiment 4B comprises the MEA layer structure 2-4-5-6-5'-3'-2' (i.e. cathode GDL without microlayer but with barrier layer, anode GDL with microlayer).

Embodiment 4C comprises the MEA layer structure 2-3-4-5-6-5'-2' (i.e. cathode GDL with microlayer and barrier layer, anode GDL without microlayer).

Finally, embodiment 4D comprises the MEA layer structure 2-4-5-6-5'-2' (i.e. cathode GDL without microlayer but with barrier layer, anode GDL without microlayer).

Figure 4:
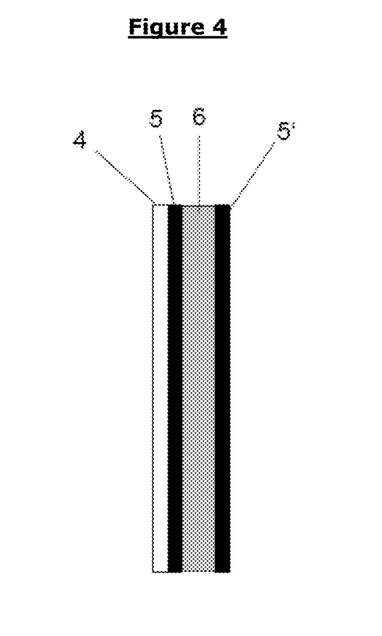

In a further embodiment (embodiment 5), the barrier layer (BL) may be applied directly to the catalyst-coated membrane (CCM) instead applying it to the gas diffusion layers (GDL). This embodiment 5 encompasses catalyst-coated membranes (CCMs) which contain barrier layers either on the cathode or the anode side or on both sides. After the assembly of such 4-layer or 5-layer CCMs with appropriate GDLs on anode and cathode side (either with or without micro-porous layer), essentially the MEA layer structures of embodiments 1A to 4D will result (see above). FIG. 4 shows an example of Embodiment 5. A 4-layer MEA comprising a barrier layer on the cathode side (4) is shown. This barrier layer (4) is directly applied on the surface of the cathode catalyst layer (5).

Figure 5:
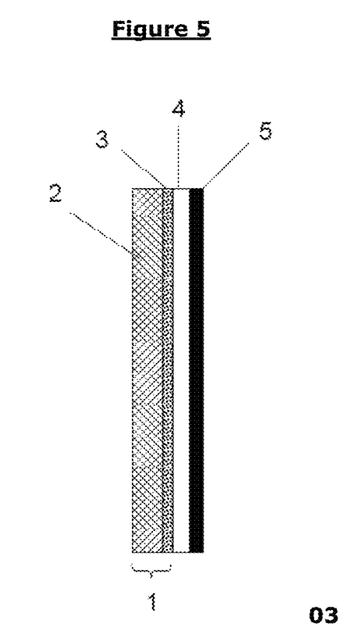

In a further alternative embodiment (embodiment 6), gas diffusion electrodes (abbreviated GDEs) are employed. Such GDEs are obtained by coating standard gas diffusion layers GDLs (with or without microlayer) with a suitable anode or cathode electrocatalyst. Thus GDEs are often referred to as "catalysed" GDLs or "catalyst-coated gas diffusion layers". Embodiment 6 encompasses gas diffusion electrodes (GDE) comprising a barrier layer. Hereby, starting from a GDL with a barrier layer (BL), electrocatalyst layers may be coated on top of the BL, using suitable electrocatalyst inks. After drying, the GDL with barrier layer and catalyst layer (i.e. a GDE with barrier layer) can be applied to an ionomer membrane by heat and pressure to obtain a final MEA according to the present invention. As an example of embodiment 6, FIG. 5 shows a gas diffusion electrode for the cathode side, containing a barrier layer (4) coated with a cathode catalyst layer (5).

In a still further embodiment (embodiment 7), the present invention encompasses gas diffusion layers (GDLs) coated with the barrier layer (4) of the present invention. The GDL may comprise a microlayer (3) (i.e. layer structure 2-3-4) or may be without microlayer. In the latter case, the barrier layer (4) is coated directly on the surface of the gas diffusion layer macro-porous backing (2), i.e. the layer structure is 2-4.

As a basic feature, the corrosion-resistant MEAs of the present invention comprise at least one barrier layer (BL). As described above, this barrier layer (BL) may be present on both sides or only on one side of the MEA (cathode or anode side only) thus representing the various embodiments described. However, various additional combinations may be applied.

In embodiments 1 and 2, the barrier layer is applied to both MEA sides. Combinations, in which a catalyst layer is coated with the BL on one side and the GDL is coated with the BL on the other side are also possible.

In embodiments 3 and 4, where only one side of the MEA contains a barrier layer, various combined techniques are feasible provided that only one GDL or one side of the CCM may be coated.

It is clear to the person skilled in the art that different orders and combinations in the manufacturing and assembly of the successive layers of the MEA can be conceived, without departing from the scope of the present invention.

In general, the present invention refers to any electrochemical device, comprising at least one barrier layer (4, 4') of the present invention either on the cathode side, on the anode side or on the cathode and on the anode side.

In more detail, the present invention refers to a membrane-electrode assembly comprising at least one barrier layer (4, 4'), wherein the at least one barrier layer (4, 4') is positioned between the catalyst layer (5, 5') and the gas diffusion layer (1, 1')

In further detail, the present invention refers to a catalyst-coated membrane, comprising an ionomer membrane (6), two catalyst layers (5, 5') and at least one barrier layer (4), wherein the at least one barrier layer (4) is positioned on at least one of the catalyst layers (5, 5') on the side not facing the membrane.

Further, the present invention refers to a gas diffusion electrode, comprising a carbon-based gas diffusion layer (1), optionally comprising a micro-porous layer (3), and comprising a barrier layer (4); wherein a catalyst layer (5) is coated on the barrier layer (4).

Still further, the present invention refers to a carbon-based gas diffusion layer (GDL, 1), optionally comprising a micro-porous layer (3), and comprising a barrier layer (4).

Finally, the barrier layer according to the present invention may be used in electrochemical devices selected from the group of PEM fuel cells, PEM electrolysers, regenerative PEM fuel cells, redox-flow batteries and batteries.

Additionally, the membrane electrode assemblies (MEAs), catalyst-coated membranes (CCMs), gas diffusion electrodes (GDEs) and gas diffusion layers according to the present invention find use in PEM fuel cells, PEM electrolysers, regenerative PEM fuel cells, redox-flow batteries or batteries.

Materials Selection

Typically, backing layers 2 and 2' are sheets of woven carbon fabric, carbon paper, non-woven or felt carbon-based materials, often advantageously made hydrophobic by treatment with a hydrophobic material, e.g. polytetra-fluoroethylene (PTFE).

Micro-porous layers ("microlayers") 3 and 3' normally comprise mixtures of carbon particles and a hydrophobic binder, typically also PTFE or other fluorinated polymers. The presence of micro-porous layers on the GDL surface is optional, i.e. on one or both sides of the MEA, the micro-porous layer 3 and/or 3' may not be present.

Generally, GDLs with or without micro-porous layers are well known in the prior art. Commercially available GDLs comprising micro-porous layer are for example: Sigracet® 10BC, 24BC, 25BC, 24BCH, 25BCH and 34BC from SGL Group, Meitingen (Germany); H2315 I2 C6 and H2315 I2 C8 from Freudenberg FCCT KG, Weinheim (Germany); AvCarb® GDS3215, GDS2230, GDS2120 and GDS1120 from Ballard Power Systems Inc., Burnaby Canada; N1S1007 and W1S1005 from CeTech Co., Ltd., Taichung County, Taiwan.

Commercial GDL types without micro-porous layer are e.g.: Sigracet® 10BA, 24BA, 25BA and 34BA from SGL Group; H2315 I2 from Freudenberg FCCT KG; TGP-H-60 and TGP-H-120 from Toray Industries, Inc., JP; N0S1005 and W0S1002 from CeTech Co., Ltd.

The catalyst layers 5 and 5' typically contain finely divided precious metals selected from the group of platinum (Pt), palladium (Pd), ruthenium (Ru) or rhodium (Rh), optionally mixed or alloyed with base metals such as Co, Ni, Mn, Cr or Cu. The electrocatalyst materials are mixed with an ionomer component. The precious metals are typically supported on a carbon black based support. Suitable support materials are typically carbon black (preferably graphitized types with improved corrosion resistance) or conductive ceramic materials (e.g. metal oxides). The electrocatalyst may also be present without a support (e.g. platinum black). The composition of cathode catalyst layer 5 and anode catalyst layer 5' may differ or may be the same, but typically they differ in type and amount of electrocatalyst(s) employed. The catalyst layers 5 and 5' may additionally comprise, together with the electrocatalyst material and the ionomer, a second electrocatalyst material facilitating the oxygen evolution reaction (water splitting) at high electrode potentials, such as iridium or ruthenium oxides.

Vacuum deposition processes may also be used to fabricate the catalyst layers 5 and 5', particularly the anode catalyst layer 5'. Such processes include physical vapor deposition (PVD), chemical vapor deposition (CVD) and sputtering processes.

Catalyst layers as described herein are well known in the art.

As a basic feature, the MEA of the present invention comprises at least one barrier layer (BL) for corrosion protection. This barrier layer (BL) acts as an electrically conductive separator layer between the carbon-containing GDL materials and the catalyst layers of the MEA. As a specific feature, the barrier layer does not comprise any proton-conducting components or ionomer materials.

In more detail, the barrier layer (BL) comprises an electrically conductive ceramic material (such as, for example, a conductive metal oxide) stable to oxidation at high cell potentials, i.e. at cell potentials>1.2 V. By the term "electrically conductive" it is meant that the ceramic material is able to transport electrons with an electrical conductivity of >0.1 S/cm, preferably >1 S/cm and particularly preferred 10 S/cm in air atmosphere. The value of electrical conductivity is detected according to the powder method described in the Experimental section. It should be mentioned that all measurements of electrical conductivity are determined under air atmosphere.

It was found that materials with lower electrical conductivity (i.e. <0.1 S/cm) lead to high resistance in the barrier layer and thus cause high performance losses in the resulting PEM fuel cell.

By the term "stable to oxidation" it is meant that the conductive ceramic material does not dissolve or lose its electrical conductivity when exposed to the high potentials in acidic media while admitting that, in the case of a conductive ceramic, the metal constituent may change its oxidation state. The electrically conductive ceramic material in the BL should be generally stable to acids, preferably under potential control. By this term, it is meant that the conductive ceramic material should exhibit a high acid stability, i.e. the solubility of the material should be $<10^{-3}$ mol/l, preferably $<10^{-4}$ mol/l, more preferably $<10^{-5}$ mol/l upon acidic treatment in 1 M $H_2SO_4$ at 90° C. Details of this testing method are given in the Experimental section.

Additionally, the barrier layer (BL) comprises a polymeric binder, which keeps the metal or ceramic particles together and confers good mechanical properties to the layer. The polymeric binder may be an organic polymer, preferably a fluorinated polymer.

In general, the electrically conductive ceramic material is selected from the group of precious metal and/or base metal containing oxides, carbides, nitrides, borides and mixtures and combinations thereof.

More than one metal or conductive ceramic material may be present in the barrier layer. These can be mixed or may be present in distinct sub-layers to form the BL. In the latter case, it is advantageous that a conductive ceramic stable to acids is present in the sub-layer in contact with the catalyst layer, while the feature of acid stability is not so important for the conductive ceramic opposite to the catalyst layer, i.e. on the side of the GDL, since a non-ionomeric binder is employed in the BL sub-layers. Multiple layers for barrier layer construction may be advantageous when e.g. employing a more expensive material at lower loading for one sub-layer and a less expensive material at higher loading for another sub-layer. As an example, a highly acid-stable expensive material such as iridium oxide can be used in a very thin sub-layer on the catalyst layer side, while a cheaper conductive metal oxide with lower acid stability can be used, if applicable, in a thicker second sub-layer on the GDL side. The polymeric binder may be the same or different in the different sub-layers.

As already mentioned, the conductive ceramic material should have an electrical conductivity of >0.1 S/cm, preferably >1 S/cm and particularly preferred >10 S/cm in air atmosphere (as detected by the powder method).

Suitable examples are ceramic materials selected from the group of ruthenium oxides ($RuO_2$, $Ru_2O_3$), iridium oxides ($Ir_2O_3$, $IrO_2$), mixed ruthenium-iridium oxides ($Ru_xIr_{1-x}O_2$), iridium-tantalum oxide ($Ir_xTa_{1-x}O_2$), ruthenium-titanium oxide ($Ru_xTi_{1-x}O_2$), titanium diboride ($TiB_2$), molybdenum nitride ($Mo_2N$), tantalum carbide ($TaC_x$), tantalum carbonitride ($TaC_xN_{1-x}$), tungsten carbide (WC), titanium carbide (TiC), titanium nitride (TiN), titanium oxynitride (TiON), niobium doped titanium oxide ($Nb_xTi_{1-x}O_2$), nickel tantalum carbide ($Ni_xTa_yC_z$), niobium doped tin dioxide ($Nb_xSn_{1-x}O_2$) and mixtures and combinations thereof.

Preferably, the ceramic material is selected from the group of iridium oxides ($Ir_2O_3$, $IrO_2$), mixed ruthenium-iridium oxides ($Ru_xIr_{1-x}O_2$), iridium-tantalum oxide ($Ir_xTa_{1-x}O_2$), ruthenium-titanium oxide ($Ru_xTi_{1-x}O_2$), titanium diboride ($TiB_2$), molybdenum nitride ($Mo_2N$), tantalum carbide ($TaC_x$) and tantalum carbonitride ($TaC_xN_y$).

In a particularly preferred embodiment, the electrically conductive ceramic material may be supported on a non-conductive, inert refractory oxide such as $SiO_2$, $TiO_2$, $Al_2O_3$ or $ZrO_2$ or mixtures thereof. Examples for such supported conductive oxides are $IrO_2/TiO_2$, $IrO_2/Al_2O_3$, $IrO_2/SiO_2$ and $IrO_2/ZrO_2$ as disclosed in EP 1701790B1.

Generally, the thickness of the barrier layer (BL) after the drying process is in the range of 0.01 to 300 microns, preferably in the range of 0.1 microns to 100 microns. When no micro-porous layer is present on the GDL, a thickness after drying in the range of 1 to 100 microns is particularly preferred. Thicknesses of around 2 to 50 microns are most preferred in this case. In this case, the barrier layer of the present invention may simultaneously take the function of a micro-porous layer on the GDL substrate.

The barrier layer may partially penetrate the GDL. For example, when the BL is fabricated from a liquid dispersion and applied directly on the macro-porous layer of a GDL without micro-porous layer, it is easily understood that part of the materials of the BL may penetrate the pores of the GDL. In this case the thickness of the BL may be identified as the thickness of the layer which is external to the GDL backing porosity.

The metal or conductive ceramic material is present in the BL in the form of particles with shapes ranging from spherical to aggregates of spherical primary particles or "fibrillar", i.e. tube like appearance and eventually partially agglomerated (agglomerates are bundles of aggregates). The particle size of such BL material (particles, agglomerates or aggregates) as defined above can range from 0.01 microns to 5 microns, preferably from 0.02 microns to 1 micron. For fibrous materials the length of the tube can be as long as tens of microns and the diameter should be lower than 0.3 microns.

The metal or conductive ceramic material is typically provided in form of fine micron-sized powders but aqueous or solvent based suspensions may also be an option.

Typical porosity of the barrier layer is in the range of >0.4 void volume calculated from the film weight and thickness (e.g. by SEM) and the density of the constituent materials. An alternative way of investigating the void volume is mercury intrusion and void should be >0.3. Secondary pore sizes (pathway of reactants) of the BL determined by Hg intrusion should be in the range of 0.01 to 10 µm. Preferred range of pore sizes is in the range of 0.04 to 1 µm. A preferred range is from 0.08 to 0.4 µm.

The polymeric binder may be selected in order to provide the desired hydrophilic/hydrophobic properties to the BL. Fluorinated polymers are preferred, perfluorinated ones even more preferred. By fluorinated polymer it is meant a polymer where a substantial amount of hydrogen atoms attached to carbon atoms in the macromolecular chain have been substituted by fluorine atoms. By perfluorinated (or fully fluorinated) polymer it is meant a polymer in which all the hydrogen atoms attached to carbon atoms in the macromolecular chain have been replaced by fluorine atoms, or eventually, in smaller amounts, by heteroatoms like chlorine, iodine and bromine. Oxygen atoms and other heteroatoms like nitrogen, sulfur and phosphorus can also be incorporated in (per)fluorinated polymers.

The polymer binder is a non-ionomeric polymer, i.e., the polymer chains do not contain any ionic moieties, which could provide proton conductivity.

The non-ionomeric polymer binder is selected from the group of polytetrafluoroethylene (PTFE), ethylene/tetrafluorethylene copolymers (ETFE), fluorinated ethylene/propylene copolymers (FEP), tetrafluoroethylene/perfluoroalkoxyvinyl copolymers (PFA), polyvinylidene fluoride (PVDF), vinylidene fluoride (VDF) copolymers, tetrafluorethylene/hexafluoropropylene/vinylidene fluoride terpolymers (THV), perfluoro rubbers (PFR) and mixtures and combinations thereof.

Polytetrafluoroethylene (PTFE) is preferred, especially when the BL is prepared on the GDL which allows high-temperature sintering (T>330-340° C.) of the PTFE after BL fabrication. PTFE is typically provided in the form of a water-based dispersion, with particle size ranging from a few tens of nanometers to a few microns.

When the BL is prepared directly on the electrode of a catalyst-coated-membrane (CCM) according to embodiment 5, materials allowing low-temperature sintering or requiring no sintering are advantageously used. This is due to the impossibility of high-temperature sintering which would damage the temperature-sensitive CCM.

Fluorinated semi-crystalline polymers with a melting point $T_m$<250° C. may be employed in this case, e.g. polyvinylidene-fluoride (PVDF) and semi crystalline copolymers of vinylidene-fluoride.

Further, amorphous glassy polymers with a glass transition point $T_g$<200° C. may be employed. Examples are Teflon® AF from DuPont, Hyflon® AD from Solvay or Cytop® from Asahi Glass.

Further, rubbery fluoropolymers may be employed, such as perfluoro rubbers (PFR) or vinylidene fluoride/hexafluoropropylene (VDF/HFP) rubbery copolymers.

The materials above are typically provided in the form of water-based dispersions or emulsion polymerization latexes.

Normally, a sintering step is required after application of the BL containing such dispersions.

However, soluble fluorinated polymers may also be employed which require no sintering. Solutions of PVDF or VDF/HFP copolymers or amorphous glassy polymers such as Teflon® AF, Hyflon® AD or Cytop® may be provided in non-fluorinated polar solvents (e.g. for the case of PVDF or VDF/HFP copolymers) or fluorinated solvents (e.g. for the case of amorphous glassy perfluorinated polymers).

As with the conductive ceramic materials, more than one polymer may be used as binder in the barrier layer of the present invention. These different polymer materials may be mixed in one layer or may be present separately in distinct sub-layers.

When a micro-porous layer is present on the GDL, the polymer binder in the BL may be chosen so that it confers hydrophobic properties similar to those of the micro-porous layer, i.e. the same or a similar binder in chemical nature may be employed.

The weight ratio between the conductive ceramic material and the polymeric binder in the barrier layer can vary in accordance with the desired porosity and hydrophobic/hydrophilic properties of the layer. This can be expressed as the weight percent (wt.-%) of the polymeric binder in the dry layer, i.e. binder/(binder+inorganic material)×100 and is typically in the range of 0.5 to 50 wt.-%, preferably in the range of 1 to 25 wt.-% based on the total weight of the dry layer composition.

The barrier layer of the present invention can be prepared by different fabrication routes. Typically, a liquid ink is first prepared comprising the metal or conductive ceramic materials and the polymeric binder materials in a liquid medium. Depending on the polymeric binder(s), the liquid medium may be D.I. water or a mixture of water and one or more polar solvents. Further, the liquid medium can be a polar solvent or a mixture of polar solvents or it can be a non-polar solvent or a mixture of non-polar solvents, eventually fluorinated or perfluorinated.

Further, dispersants, surfactants and other agents, such as thickening agents, may be added to the barrier layer ink. Pore formers may also be added to aid porosity formation during drying of the layer.

Generally, the barrier layer inks of the present invention may be prepared in the same way as conventional catalyst inks. Typically, various dispersing equipments (e.g. high-speed stirrers, roll mills, vertical or horizontal bead mills, asymmetric centrifuges, magnetic mixers, mechanical mixers, ultrasonic mixers, etc.) are used. The preparation of catalyst inks is well known to the person skilled in the art.

The liquid dispersion ("barrier layer ink") is then coated or printed on the GDL or the CCM in a thin layer by techniques known to the person skilled in the art. Coating techniques that can be employed are for instance spraying, brushing, screen printing, offset printing, gravure printing, stencil printing, ink-jet printing, doctor-blade coating, bar coating, slot die coating, curtain coating, cascade coating, etc.

After application of the barrier layer ink, a drying step is applied to remove the solvent(s) of the ink deposits. Drying is typically performed in conventional or IR heated box ovens or belt furnaces at temperatures in the range of 50 to 200° C., preferably in the range of 50 to 150° C. Optionally, such heat treatment may be performed under protective atmosphere (nitrogen, argon).

Following the drying step, a high temperature step can be optionally performed e.g. to sinter the polymer binder if required and remove any high-boiling additives from the deposited layer. Optionally the drying step may be combined with a subsequent high temperature sintering step in a continuous heating treatment process. Optionally, such heat treatment may be performed under protective atmosphere (e.g. nitrogen, argon).

In such a manner, a GDL or a CCM with a barrier layer is obtained.

GDLs with BLs can be applied to a CCM by a lamination process (employing heat and pressure) to obtain a final MEA according to the present invention (ref to embodiments 1 to 4).

GDLs with BLs may also be applied to the CCM when assembling the MEAs, i.e. stacking them into the fuel cell stack alternated to the other components, i.e. bipolar plates, gaskets and CCMs. This case is often referred to as MEAs with "loose GDLs." In this case, the GDLs most often become tightly bonded to the catalyst layers during operation of the PEMFC, due to pressure and local heat dissipation.

In an alternative process (ref. to embodiment 5), the barrier layer can be coated on top of the catalyst layers of a regular catalyst-coated membrane (CCM), and standard GDLs can then be applied to the BL-coated CCM, for example by lamination, to obtain a final MEA according to the invention. The standard GDLs may also be mounted "loose" on the two sides of the BL-coated CCM when assembling the MEA in the formation of the PEMFC stack.

In a further alternative (ref to embodiment 6), gas diffusion electrodes (GDEs) comprising barrier layers (BL) are provided. Hereby, starting from a GDL with a barrier layer (BL), electrocatalyst layers may be coated on top of the BL, using suitable electrocatalyst inks as previously outlined. The final MEA according to the present invention is obtained in by laminating anode and cathode GDEs onto the front and back side of an ionomer membrane.

Other processes to obtain a corrosion-resistant MEA according to the present invention are also possible. For example, starting from a carrier substrate, e.g. a polymer film, a first barrier layer, a first electrocatalyst layer, a polymer electrolyte membrane, a second catalyst layer and a second barrier layer are coated in succession, with or without intermediate drying steps, according to what is generally called an "integral" CCM fabrication method. The CCM comprising one or more barrier layers obtained in this manner may then be combined with GDLs to obtain a final MEA according to the invention. Successive coating of layers, including the barrier layers, with or without intermediate drying steps, can also be accomplished starting from a GDL, according to what can be named an "integral" MEA fabrication method.

The introduction of at least one additional layer (herein called "barrier layer", BL) results in MEAs showing improved stability against high cell potential events. Such improved stability and simultaneous high performance is achieved by introducing an additional layer (hereinafter called "barrier layer", BL) between the catalyst layer and the gas diffusion layer (GDL), comprising an oxidation-resistant metal or conductive ceramic material in combination with a polymeric binder. The MEAs based on the various embodiments of the present invention are tested and evaluated in PEMFCs in the course of various electrochemical testing procedures (ref to experimental section).

Further, surprising benefits have been found. When a GDL with barrier layer is applied to a CCM, e.g. by hot pressing, or a GDL is applied to a CCM with barrier layer, the BL may provide the additional advantageous feature of improving the adhesion of the CCM to the GDL, which in turn improves the performance and durability of the MEA. In general, and independent of the MEA manufacturing method, the barrier layer can act as a "tie layer" between the electrocatalyst layers and the GDLs thus improving the performance and durability of the MEAs In a specific embodiment, the present invention may also be applied to the manufacture of corrosion resistant MEAs for electrolysis. For such electrolysis-MEAs, which are operated in a reversed way compared to regular PEMFC MEAs (ref to introductory part), the introduction of at least one additional layer ("barrier layer", BL) results in MEAs with improved corrosion resistance. In this case, the BL is advantageously introduced between the anode layer, which is operated at high potentials in the electrolysis mode, and the gas diffusion layer, carbon- or metal-based, or the "current collector" (in electrolysis technology, metal-based GDLs or gas diffusion media, such as metal nets or metal porous substrates, are often referred to as "current collectors"). This eventually allows the use of cheap and easy-to-handle carbon-based GDLs as diffusion media instead of expensive GDL substrates ("current collectors") such as e.g. titanium nets or porous metal substrates (often further treated with precious metal coatings) which are typically used on the anode side of an electrolyser when in direct contact with the catalyst layer. This also eventually allows avoiding precious metal coatings of the metal-based current collectors, which are protected against corrosion by the presence of the barrier layer.

Membrane-electrode assemblies (MEAs), catalyst-coated membranes (CCMs), gas diffusion electrodes (GDEs) and gas diffusion layers (GDLs) comprising the barrier layer of the invention show improved corrosion resistance, preferably against carbon corrosion; particularly in start-up/shut-down cycles and fuel starvation situations of PEM fuel cells.

Although the specific examples are described herein for illustrative purposes, various equivalent modifications may be made without departing from the spirit and scope of the disclosure, as will be recognized by those skilled in the relevant art. The teachings of the various examples provided herein may be applied to all types of MEAs, not necessarily the exemplary MEAs described in the following section.

In general, in the following examples should not be construed to limit the claims to the specific embodiments disclosed.

Experimental Section

Measurement of Electrical Conductivity (Powder Method)

A 4-point powder conductivity unit provided by Mitsubishi Chemical (Loresta PA system, MCP-PD51) is employed for the method. The ceramic powder is filled into a measurement compartment and then the sample is compacted by a pressure piston. The conductivity is measured under different compaction pressures by the four point method, i.e. a current is passed through two electrodes and the difference in potential is measured between two other electrodes. The conductivity measurement results are reported for a pressure of 63 MPa at room temperature (T~23° C.). The electrical conductivity of Elyst Ir75 0480 is typically ~100 S/cm.

Measurement of Acid Resistance

Dissolution in acid is detected by soaking the ceramic powder in 1 molar (1 M) sulphuric acid at 90° C. for 24 h. The ratio of powder weight to the quantity of sulfuric acid is 1 g to 100 ml acid. Approximately 10 g of ceramic powder are employed for testing. After acid soaking for 24 hours at 90° C., the residual suspension is filtered and the non-dissolved material is removed. The remaining solution is analyzed by Inductive Coupled Plasma analysis (ICP-OES) to determine the quantity of dissolved metals/elements leached out from the ceramic material.

For Elyst Ir75 0480 typical values of ~$2 \times 10^{-6}$ mol/l Ir and ~$1 \times 10^{-4}$ mol/l Ti is found. This indicates a loss of 0.009 wt.-% of Ir and a loss of 0.55 wt.-% Ti (in both cases based on the metals employed). Thus, a very low acid solubility of <$10^{-3}$ mol/l is found.

For comparison, a commercially available $In_2O_3$—$SnO_2$ material (ITO, Inframat Nano-powder) is tested. The ITO material dissolves during the described test and a quantity of $6 \times 10^{-2}$ mol In/l is found in the remaining solution by ICP, thus indicating a high acid solubility of ITO (i.e. loss of 98 wt.-% of In employed).

Electrochemical Testing

Electrochemical testing is performed in a 50 $cm^2$ PEM single cell fitted with graphitic serpentine flow field plates. The single cell is thermally controlled by K-type thermocouples, resistive heating pads for heating and a ventilator for air cooling. Gases are humidified using bubblers. The cell is operated in counter flow. All MEA samples are sealed with incompressible glass-reinforced PTFE gaskets resulting in a 20% compression of the GDL.

Prior to performance and accelerated degradation testing of MEA samples, the cell is conditioned under hydrogen/air for 8 hours at 1 A/$cm^2$ at a pressure of 1.5 bar abs, $T_{cell}$ of 80° C., humidifier temperatures of 80° C. (anode) and 64° C. (cathode).

Hydrogen/air IV-polarization measurements are performed at beginning of life (BOL) and at end of test (EOT), under the following condition: $T_{cell}$=60° C., humidifier temperatures=60° C. (both sides), pressure=1.5 bar abs, anode stoichiometry=1.5, cathode stoichiometry=2.

High Potential "Corrosion" Testing

To simulate degradation induced by high cell potentials in air/air start up/shut down (current reverse) and fuel starvation (cell reversal) conditions in PEMFC, a potentiostatic holding experiment is used.

For this experiment the working electrode ("cathode") is purged with nitrogen at 40 nl $h^{-1}$ and then set to a high potential of 1.4 V versus the reference/counter electrode ("anode") which is supplied with hydrogen at 30 nl $h^{-1}$. The cell is operated at 80° C., ambient pressure and at full humidification of both gases. In intervals of every two hours a short polarization experiment at 0.2, 0.8 and 1.2 A/$cm^2$ is made under the conditions reported above for the IV-polarization measurements. This is repeated for a total of 10 hours at high cell potential (5 cycles).

EXAMPLES

Example 1

Preparation of Catalyst-Coated Membranes (CCM)

A catalyst-coated membrane ("CCM") is provided having an anode catalyst loading of 0.1 mg Pt/$cm^2$ (based on Pt/C-catalyst Elyst® 20Pt 0350 from Umicore AG & Co KG, Hanau, Germany) and a cathode platinum loading of 0.5 mg Pt/$cm^2$, based on Pt black (Umicore AG & Co KG, Hanau, Germany) mixed with $IrO_2$/$TiO_2$ catalyst Elyst Ir75 0480 (Umicore AG & Co KG) in a ratio of 30:70 applied on both sides of an ionomer membrane Nafion® 212CS (thickness 50.8 µm, DuPont, USA). The catalyst layers are applied by standard decal methods. The active area of both catalyst layers is 71 mm×71 mm and the overall membrane size is 110 mm×110 mm.

Example 2

Preparation of a GDL with Barrier Layer (BL)

To a water-based PTFE dispersion TF 5032Z (Dyneon GmbH, Burgkirchen, Germany), containing 55.2 wt.-% PTFE with average particle size of 160 nm and 3.8 wt.-% emulsifier, solvent dipropylene glycol (Merck Cat. No. 803265) is added to obtain a dispersion with the following composition (wt.-%):

| | |
|---|---|
| PTFE (solid polymer) | 9.0 wt.-% |
| DI Water: | 6.7 wt.-% |
| Emulsifier: | 0.6 wt.-% |
| Dipropylene glycol: | 83.7 wt.-% |
| Total | 100.0 wt.-% |

The dispersion is then stirred for 30 minutes. Thereafter, 30.0 grams of a supported conductive metal oxide $IrO_2/TiO_2$ (Elyst® Ir75 0480; Umicore AG & Co KG) is then added to 70.0 grams of the PTFE dispersion prepared above and the mixture is thoroughly dispersed in a bead mill (grinding media zirconia, ca. 1 mm diameter, milling time 30 minutes at about 2.000 rpm). The resulting barrier layer ink contains 30.0 wt.-% $IrO_2/TiO_2$ oxide material and 6.3 wt.-% PTFE. This results in a ratio of Ir oxide material/PTFE=4.76:1, i.e. a binder content of 17.4%.

The barrier layer ink is screen-printed on a gas diffusion layer (GDL) Sigracet® 24BC (SGL-Carbon, Meitingen Germany) on the side coated with a micro-porous layer and dried in a belt oven for 8 minutes at a peak drying temperature of 95° C. A loading of ca. 0.55 mg Ir/cm² is obtained on the GDL, corresponding to a barrier layer (BL) thickness of about 2.5 to 3 microns after drying.

After drying, the coated GDL is further annealed by heat treatment in a box oven at a peak temperature of 340° C. for about 10 minutes under nitrogen atmosphere.

The BL-coated GDL thus obtained is assembled with the CCMs described in Example 1. In such case it is placed loose against the cathode catalyst layer of the CCM within the flow field plates of a test cell to assemble a MEA according to the embodiment 4A of the present invention, which is shown in FIG. 3.

Results of Electrochemical Testing

CCM samples prepared as described in Example 1 are mounted in the single cell and GDLs (either coated or non-coated) are applied on two sides.

First group (MEAs 1 and 2): On the anode side, a standard Sigracet® 24BC (SGL) is applied. On the cathode side, a GDL with a barrier layer as prepared in Example 2 (according to the invention) is applied.

Second group (MEAs REF 1 and REF 2): On the anode and on the cathode side both a standard Sigracet® 24BC (SGL) is applied.

The results are shown in Table 1. As can be seen in this table, the MEAs containing GDLs with the barrier layer (BL) according to the present invention (MEAs 1 and 2) reveal a very good performance in the accelerated corrosion testing. They show a high resistance to the high potential treatment demonstrated by a low voltage loss in the range of less than 7% based on BOL performance. Contrary to that, the voltage loss of MEAs without barrier layer (REF 1 and REF 2) reveal a high voltage loss in the range of 50% based on the BOL performance.

TABLE 1

Results of High cell potential corrosion testing

| Sample | Cathode GDL | BOL (1) performance (V) | EOT (2) Performance (V) | Voltage loss (%) |
|---|---|---|---|---|
| MEA 1 | +Barrier layer | 0.735 | 0.702 | −4 |
| MEA 2 | +Barrier layer | 0.733 | 0.679 | −7 |
| REF 1 | 24 BC | 0.733 | 0.370 | −49 |
| Ref 2 | 24 BC | 0.737 | 0.433 | −41 |

(1) cell voltage detected at 0.2 A/cm²
(2) end of test measurement after 10 h at 1.4 V

What is claimed is:

1. A membrane-electrode assembly or a catalyst-coated membrane comprising at least one barrier layer, wherein the membrane-electrode assembly further comprises a catalyst layer and a gas diffusion layer and the barrier layer is positioned between the catalyst layer and the gas diffusion layer, wherein the catalyst-coated membrane further comprises an ionomer membrane and two catalyst layers and the barrier layer is positioned on at least one of the catalyst layers, wherein said barrier layer comprises electrically conductive ceramic material and a non-ionometic polymer binder, and wherein the barrier layer is a distinct layer from the gas diffusion layer and from any microporous layers attached to the gas diffusion layer, wherein the electrically conductive ceramic material is selected from the group consisting of iridium-tantalum oxides ($Ir_xTa_{1-x}O_2$), ruthenium-titanium oxides ($Ru_xTi_{1-x}O_2$), titanium diboride ($TiB_2$), molybdenum nitride ($Mo_2N$), tantalum carbide ($TaC_x$), tantalum carbonitride ($TaC_xN_{1-x}$), tungsten carbide (WC), titanium carbide (Tic), titanium nitride (TiN), titanium oxynitride (TiON), niobium doped titanium oxides ($Nb_xTi_{1-x}O_2$), nickel tantalum carbide ($Ni_xTa_yC_z$), niobium doped tin dioxide ($Nb_xSn_{1-x}O_2$) and mixtures and combinations thereof and wherein the non-ionomeric polymer binder is selected from the group consisting of polytetralluoroethylene (PTFE), ethylene/tetraflutoroethylene copolymers (ETFE), fluorinated ethylene/propylene copolymers (FEP), tetrafluoroethylene/perfluoroalkoxyvinyl copolymers (PFA), polyvinylidene fluoride (PVDF), vinylidene fluoride (VDF) copolymers, tetrafluoroethylene/hexafluoropropylene/vinylidene fluoride terpolymers (THV), perfluoro rubbers (PFR), glassy amorphous fluoropolymers and mixtures and combinations thereof.

2. The membrane-electrode assembly or a catalyst-coated membrane according to claim 1, wherein the electrically conductive ceramic material has an electrical conductivity of >0.1 S/cm in air atmosphere.

3. The membrane-electrode assembly or a catalyst-coated membrane according to claim I, wherein the electrically conductive ceramic material has a high acid stability showing a solubility of <10⁻³ mol/l upon acidic treatment in 1 M $H_2SO_4$ at 90° C.

4. The membrane-electrode assembly or a catalyst-coated membrane according to claim 1, wherein the electrically conductive ceramic material is selected from the group consisting of iridium-tantalum oxide ($Ir_xTa_{1-x}O_2$), ruthenium-titanium oxide ($Ru_xTi_{1-x}O_2$), titanium diboride ($TiB_2$), molybdenum nitride ($Mo_2N$), tantalum carbide ($TaC_x$) and tantalum carbonitride ($TaC_xN_y$).

5. The membrane-electrode assembly or a catalyst-coated membrane according to claim 1, wherein the electrically conductive ceramic material is a conductive oxide supported on a non-conductive oxide.

6. The membrane-electrode assembly or a catalyst-coated membrane according to claim 1, wherein the weight ratio between the conductive material and the polymer binder is in the range of 0.5 to 50 wt. % based on the total weight of the dry layer composition.

7. The membrane-electrode assembly or a catalyst-coated membrane according to claim 1 having a layer thickness after drying in the range of 0.1 to 100 microns.

8. An electrochemical device comprising the membrane-electrode assembly or a catalyst-coated membrane according to claim 1, wherein the barrier layer is on the cathode side, the anode side or both sides of said electrochemical device.

9. A gas diffusion electrode comprising a carbon-based gas diffusion layer and a barrier layer which comprises electrically conductive ceramic material and a non-ionomeric polymer binder and wherein a catalyst layer is coated on the barrier layer and wherein the barrier layer is a distinct layer from the gas diffusion layer and from any microporous layers attached to the gas diffusion layer, wherein the electrically conductive ceramic material is selected from the group consisting of iridium-tantalum oxides ($Ir_xTa_{1-x}O_2$), ruthenium-titanium oxides ($Ru_xTi_{1-x}O_2$) titanium diboride ($TiB_2$), molybdenum nitride ($Mo_2N$), tantalum carbide ($TaC_x$), tantalum carbonitride ($TaC_xN_{1-x}$), tungsten carbide (WC), titanium carbide (TiC), titanium nitride (TiN), titanium oxynitride (TiON), niobium doped titanium oxides ($Nb_xTi_{1-x}O_2$), nickel tantalum carbide ($Ni_xTa_yC_z$), niobium doped tin dioxide ($Nb_xSn_{1-x}O_2$) and mixtures and combinations thereof, and wherein the non-ionomeric polymer binder is selected from the group consisting of polytetrafluoroethylene (PTFE), ethylene/tetrafluoroethylene copolymers (ETFE), fluorinated ethylene/propylene copolymers (FEP) tetrafluoroethylene/perfluoroalkoxyvinyl copolymers (PFA), polyvinylidene fluoride (PVDF), vinylidene fluoride (VDF) copolymers, tetrafluoroethylene/hexafluoropropylene/vinylidene fluoride terpolvmers (THV), perfluoro rubbers (PFR), glassy amorphous fluoropolymers and mixtures and combinations thereof.

10. An electrochemical device selected from the group of PEM fuel cells, PEM electrolysers, regenerative PEM fuel cells, redox-flow batteries and batteries comprising a barrier layer which comprises electrically conductive ceramic material and a non-ionomeric polymer binder, wherein the barrier layer is a distinct layer from any gas diffusion layer present in the device or from any microporous layers attached to the gas diffusion layer, wherein the electrically conductive ceramic material is selected from the group consisting of iridium-tantalum oxides ($Ir_xTa_{1-x}O_2$), ruthenium-titanium oxides ($Ru_xTi_{1-x}O_2$), titanium diboride ($TiB_2$), molybdenum nitride ($Mo_2N$), tantalum carbide ($TaC_x$), tantalum carbonitride ($TaC_xN_{1-x}$), tungsten carbide (WC), titanium carbide (TiC), titanium nitride (TiN), titanium oxynitride (TiON), niobium doped titanium oxides ($Nb_xTi_{1-x}O_2$), nickel tantalum carbide ($Ni_xTa_yC_z$), niobium doped tin dioxide ($Nb_xSn_{1-x}O_2$) and mixtures and combinations thereof, and wherein the non-ionomeric polymer binder is selected from the group consisting of polytetrafluoroethvlene (PTFE), ethylene/tetrafluoroethylene copolymers (ETFE), fluorinated ethylene/propylene copolymers (FEP), tetrafluoroethylene/perfluoroalkoxyvinyl copolymers (PFA), polyvinylidene fluoride (PVDF), vinylidene fluoride (VDF) copolymers, tetrafluoroethylene/hexafluoropropylene/vinylidene fluoride terpolymers (THV), perfluoro rubbers (PFR), glassy amorphous fluoropolymers and mixtures and combinations thereof.

11. The membrane-electrode assembly or a catalyst-coated membrane according to claim 2, wherein the electrically conductive ceramic material has an electrical conductivity of >10 S/cm in air atmosphere (as detected by the powder method).

12. The membrane-electrode assembly or a catalyst-coated membrane according to claim 3, wherein the electrically conductive ceramic material has a high acid stability showing a solubility of <$10^{-4}$ mol/l upon acidic treatment in 1 M $H_2SO_4$ at 90° C.

13. The membrane-electrode assembly or a catalyst-coated membrane according to claim 6, wherein the weight ratio between the conductive material and the polymer binder is in the range of 1 to 25 wt.-% based on the total weight of the dry layer composition.

* * * * *